US010318864B2

(12) United States Patent
Deng et al.

(10) Patent No.: US 10,318,864 B2
(45) Date of Patent: Jun. 11, 2019

(54) LEVERAGING GLOBAL DATA FOR ENTERPRISE DATA ANALYTICS

(71) Applicant: Microsoft Technology Licensing, LLC, Redmond, WA (US)

(72) Inventors: Li Deng, Redmond, WA (US); Jianfeng Gao, Woodinville, WA (US); Xiaodong He, Sammamish, WA (US); Prabhdeep Singh, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 991 days.

(21) Appl. No.: 14/808,546

(22) Filed: Jul. 24, 2015

(65) Prior Publication Data
US 2017/0024640 A1  Jan. 26, 2017

(51) Int. Cl.
*G06N 3/08*    (2006.01)
*G06N 3/04*    (2006.01)
*G06Q 10/06*   (2012.01)

(52) U.S. Cl.
CPC ........... *G06N 3/08* (2013.01); *G06N 3/04* (2013.01); *G06Q 10/067* (2013.01)

(58) Field of Classification Search
CPC . G06F 15/08; G06N 3/02; G06N 3/04; G06N 3/08; G06N 5/00; G06N 5/02; G06N 5/022; G06N 5/025; G06N 99/005; G06Q 10/067; G06Q 30/00; G06Q 30/01; G06Q 30/016; G06Q 30/02; G06Q 30/0201; G06Q 30/0202; G06Q 99/00
See application file for complete search history.

(56) References Cited

U.S. PATENT DOCUMENTS 6,836,773 B2   12/2004  Tamayo et al.
7,072,822 B2    7/2006  Humenansky et al.
(Continued)

OTHER PUBLICATIONS

Xiang Zhang and Yann LeCun, Text Understanding from Scratch, Apr. 4, 2016, The Computer Science Department, Courant Institute of Mathematical Sciences, New York University (https://arxiv.org/abs/1502.01710) (https://arxiv.org/pdf/1502.01710.pdf). (Year: 2016).*
(Continued)

*Primary Examiner* — Alan Chen
(74) *Attorney, Agent, or Firm* — Alleman Hall Creasman & Tuttle LLP

(57) ABSTRACT

A deep learning network is trained to automatically analyze enterprise data. Raw data from one or more global data sources is received, and a specific training dataset that includes data exemplary of the enterprise data is also received. The raw data from the global data sources is used to pre-train the deep learning network to predict the results of a specific enterprise outcome scenario. The specific training dataset is then used to further train the deep learning network to predict the results of a specific enterprise outcome scenario. Alternately, the raw data from the global data sources may be automatically mined to identify semantic relationships there-within, and the identified semantic relationships may be used to pre-train the deep learning network to predict the results of a specific enterprise outcome scenario.

20 Claims, 6 Drawing Sheets

(56) References Cited

U.S. PATENT DOCUMENTS

| | | | |
|---|---|---|---|
| 7,395,252 B2 | 7/2008 | Anderson et al. | |
| 7,752,070 B2 | 7/2010 | Hatcher et al. | |
| 7,840,569 B2 | 11/2010 | Meyerzon et al. | |
| 8,812,473 B1* | 8/2014 | Zwicky | G06F 17/30867 707/706 |
| 2003/0088491 A1 | 5/2003 | Liu et al. | |
| 2003/0220860 A1 | 11/2003 | Heytens et al. | |
| 2007/0005654 A1 | 1/2007 | Schachar et al. | |
| 2009/0210218 A1* | 8/2009 | Collobert | G06F 17/277 704/9 |
| 2012/0323628 A1 | 12/2012 | Jaster et al. | |
| 2014/0129371 A1 | 5/2014 | Wilson et al. | |
| 2014/0236570 A1* | 8/2014 | Heck | G06F 17/2785 704/9 |
| 2014/0278771 A1* | 9/2014 | Rehman | G06F 17/30539 705/7.31 |
| 2015/0074027 A1* | 3/2015 | Huang | G06N 3/0454 706/25 |
| 2015/0161670 A1* | 6/2015 | Shen | G06Q 30/0269 705/14.66 |
| 2015/0286873 A1* | 10/2015 | Davis | G06F 3/00 382/103 |
| 2015/0310097 A1* | 10/2015 | Achuthan | G06F 17/30392 707/722 |
| 2016/0019458 A1* | 1/2016 | Kaufhold | G01S 7/417 342/25 F |

OTHER PUBLICATIONS

Dahl, et al., "Context-Dependent Pre-Trained Deep Neural Networks for Large-Vocabulary Speech Recognition", Institute of Electrical and Electronics Engineers (IEEE) Transactions on Audio, Speech, and Language Processing, Jan. 2012, pp. 30-42, vol. 20, No. 1, IEEE.

Gao, et al., "Modeling Interestingness with Deep Neural Networks", Proceedings of the 2014 Conference on Empirical Methods on Natural Language Processing (EMNLP), Oct. 2014, pp. 12, The Association for Computational Linguistics.

Reinhold, et al., "How Companies are Implementing Social Customer Relationship Management: Insights From Two Case Studies", 26th Bled eConference—eInnovations: Challenges and Impacts for Individuals, Organizations and Society, Jun. 9-13, 2013, pp. 206-221, Bled eCommerce Conference.

Woodie, "Microsoft Spins Up a Machine Learning Cloud", Jun. 16, 2014, pp. 3, Datanami, retrieved at <<http://www.datanami.com/2014/06/16/microsoft-spins-machine-learning-cloud/>>.

"International Search Report and Written Opinion Issued in PCT Application No. PCT/US2016/042374", dated Sep. 15, 2016, 11 Pages.

"International Preliminary Report on Patentability Issued in PCT Application No, PCT/US2016/042374", dated Oct. 5, 2017, 7 Pages "Second Written Opinion Issued in PCT Application No. PCT/US2016/042374", dated Jul. 10, 2017, 6 Pages.

* cited by examiner

LEVERAGING GLOBAL DATA FOR ENTERPRISE DATA ANALYTICS

BACKGROUND

It is estimated that there are over two hundred million different companies in the world today and this number continues to grow. The commercial pursuit of each of these companies generally involves selling products and/or services to customers. A growing number of these companies employ some type of customer relationship management (CRM) system to record, manage and analyze data associated with the various types of customer transactions that take place throughout the companies' customer and product/service life-cycles. A CRM system can also be used to manage the potential customers of an enterprise for targeting with upsell and cross-sell opportunities.

SUMMARY

Analytics technique implementations described herein generally involve a system for training a deep learning network to automatically analyze enterprise data. In one exemplary implementation raw data from one or more global data sources is received. This raw data is then used to pre-train the deep learning network to predict the results of a specific enterprise outcome scenario. A training dataset that includes data that is exemplary of the enterprise data is then received. The training dataset is then used to further train the deep learning network to predict the results of a specific enterprise outcome scenario, and the trained network is output. In another exemplary implementation the raw data from the global data sources is automatically mined to identify semantic relationships there-within, and the identified semantic relationships are used to pre-train the deep learning network to predict the results of a specific enterprise outcome scenario.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the analytics technique implementations described herein will become better understood with regard to the following description, appended claims, and accompanying drawings where:

DETAILED DESCRIPTION

Figure 1:
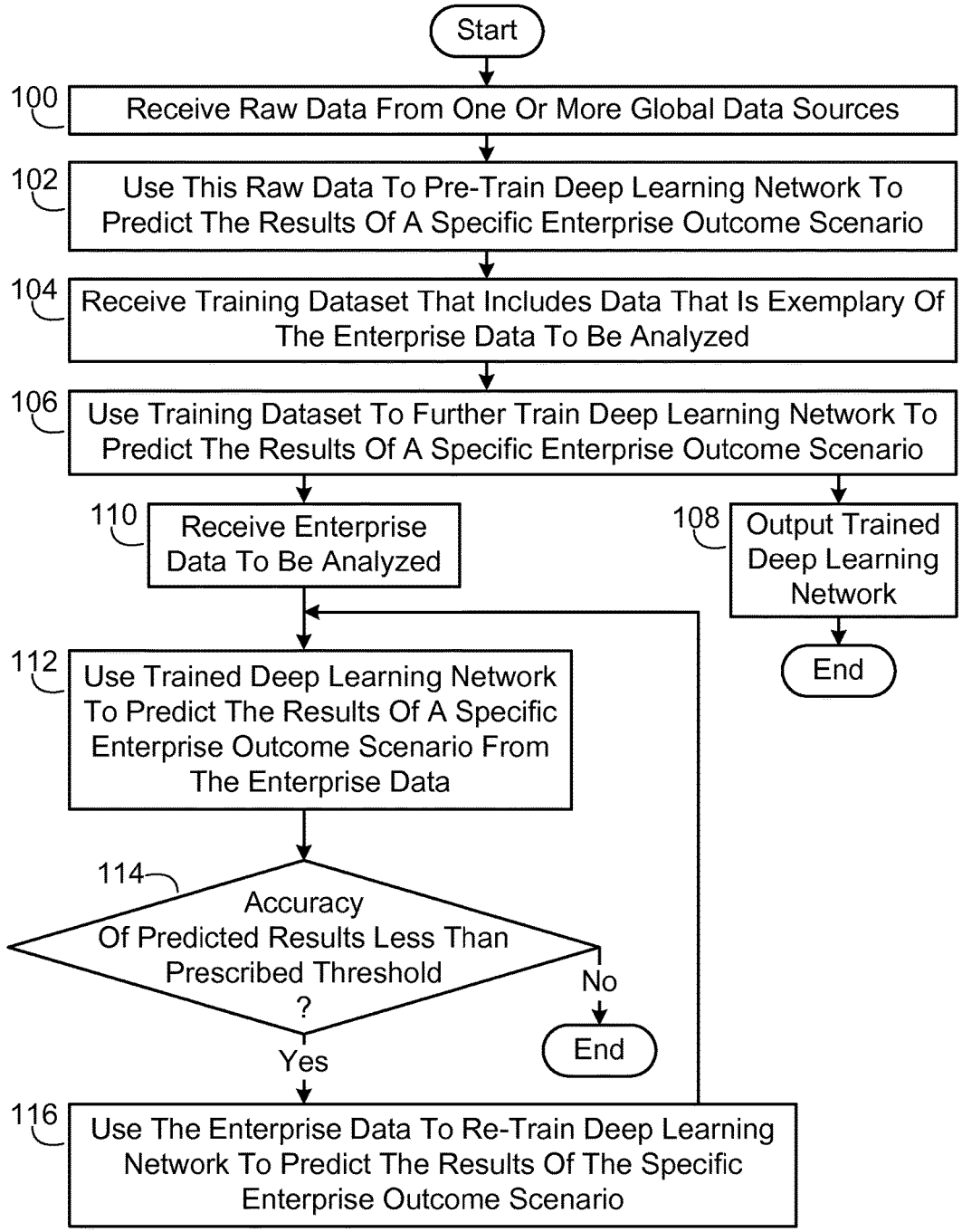
FIG. 1 is a flow diagram illustrating one implementation, in simplified form, of a process for training a deep learning network to automatically analyze enterprise data.

In the following description of analytics technique implementations reference is made to the accompanying drawings which form a part hereof, and in which are shown, by way of illustration, specific implementations in which the analytics technique can be practiced. It is understood that other implementations can be utilized and structural changes can be made without departing from the scope of the analytics technique implementations.

It is also noted that for the sake of clarity specific terminology will be resorted to in describing the analytics technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the analytics technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the analytics technique does not inherently indicate any particular order nor imply any limitations of the analytics technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Enterprise Data Analytics

The term "enterprise" is used herein to refer to a company (e.g., an organization of individuals) or a subdivision thereof that is formed for commercial purposes. Accordingly, the terms "enterprise" and "company" are synonymous in the context of the analytics technique implementations described herein. The term "enterprise data" is used herein to refer to data that is internal to and managed by an enterprise. In other words, enterprise data is data that is within the domain or the cloud of the enterprise. The term "global data" is used herein to refer to data that is external to and not managed by an enterprise. In other words, global data is data that is outside the domain of the enterprise. A given enterprise commonly manages various categories of enterprise data that are classified according to organizational processes, resources and/or standards. These enterprise data categories commonly include human resources data, supply chain management data, enterprise content management data, customer relationship management (CRM) data, and customer support data, among others.

As is appreciated in the arts of sales, marketing and customer service, the term "customer relationship management" generally refers to the practices, strategies and technologies that an enterprise (e.g., a company) may use to record, manage and analyze data associated with the various types of customer transactions that take place throughout the enterprise's customer and product/service life-cycles. CRM has various goals such as increasing the enterprise's product and/or service sales, increasing existing customer satisfaction and retention, increasing new customer generation, targeting new customers, and increasing the enterprise's profitability. A given CRM system and its applications serve to integrate the enterprise's customer data from various sources into a CRM database which may be very large and complex, where these sources of customer data may include the enterprise's website, emails, telephone calls, live chat sessions, direct mail campaigns, and social media, among other sources. The CRM system and its applications may also provide other types of functionality such as automating and/or synchronizing the enterprise's sales, marketing, customer service, and technical support activities.

As is appreciated in the art of computer-based data analysis, the term "analytics" generally refers to methods of logical analysis that can be performed on an existing dataset in order to discover valuable knowledge (e.g., intelligence) therefrom. For example, analytics may identify/find meaningful and useful patterns in the dataset. In other words, analytics is a form of data mining. Analytics are useful and effective in situations where the dataset is very large and complex. Analytics are particularly useful and effective when the dataset includes recorded information representing historical facts and/or events (e.g., the aforementioned CRM database that includes historical and transactional customer data). Accordingly, the term "predictive analytics" generally refers to a particular method of logical analysis that can be performed on an existing dataset in order to identify meaningful and useful patterns therein, and then use these identified patterns to make predictions about unknown events of interest (e.g., future outcomes, future trends, and the like). In other words, predictive analytics can be used to forecast future probabilities (e.g., predict what might happen in the future and the probability of it happening).

Predictive analytics can be employed in a wide variety of fields. For example, predictive analytics may be employed in the healthcare field to analyze various types of healthcare data such as medical images and patient records in order to predict which patients are at risk of developing certain medical conditions (e.g., diabetes, asthma, heart disease, and other lifetime illnesses). Individuals within an enterprise may also perform predictive analytics on one or more categories of their enterprise data. More particularly and by way of example but not limitation, individuals within an enterprise commonly perform predictive analytics on their CRM data in order to better understand their customers and the sales of their products and/or services, and identify their potential customer/sales opportunities and risks in the future.

2.0 Leveraging Global Data for Enterprise Data Analytics

Generally speaking, the analytics technique implementations described herein involve leveraging global data sources for performing automatic predictive analytics on enterprise data. In an exemplary implementation of the analytics technique a deep learning network is trained to automatically (e.g., in an unsupervised manner) analyze enterprise data, where this training leverages knowledge (e.g., intelligence) from one or more global data sources. As is appreciated in the arts of artificial intelligence and machine learning, the term "deep learning" (also known as "deep structured learning" and "hierarchical learning") generally refers to a class of machine learning methods that utilizes many layers or stages of nonlinear information processing which are organized in a hierarchical architecture for unsupervised feature learning and pattern analysis/classification. Accordingly, the term "deep learning network" is used herein to refer to a machine-learned classifier having a hierarchy of layers of nonlinear information processing that include an input layer, an output layer, and a plurality of additional layers that are hidden in-between the input and output layers, where these layers can be trained from end-to-end (e.g., from the input layer to the output layer) using various machine learning methods.

Figure 6:
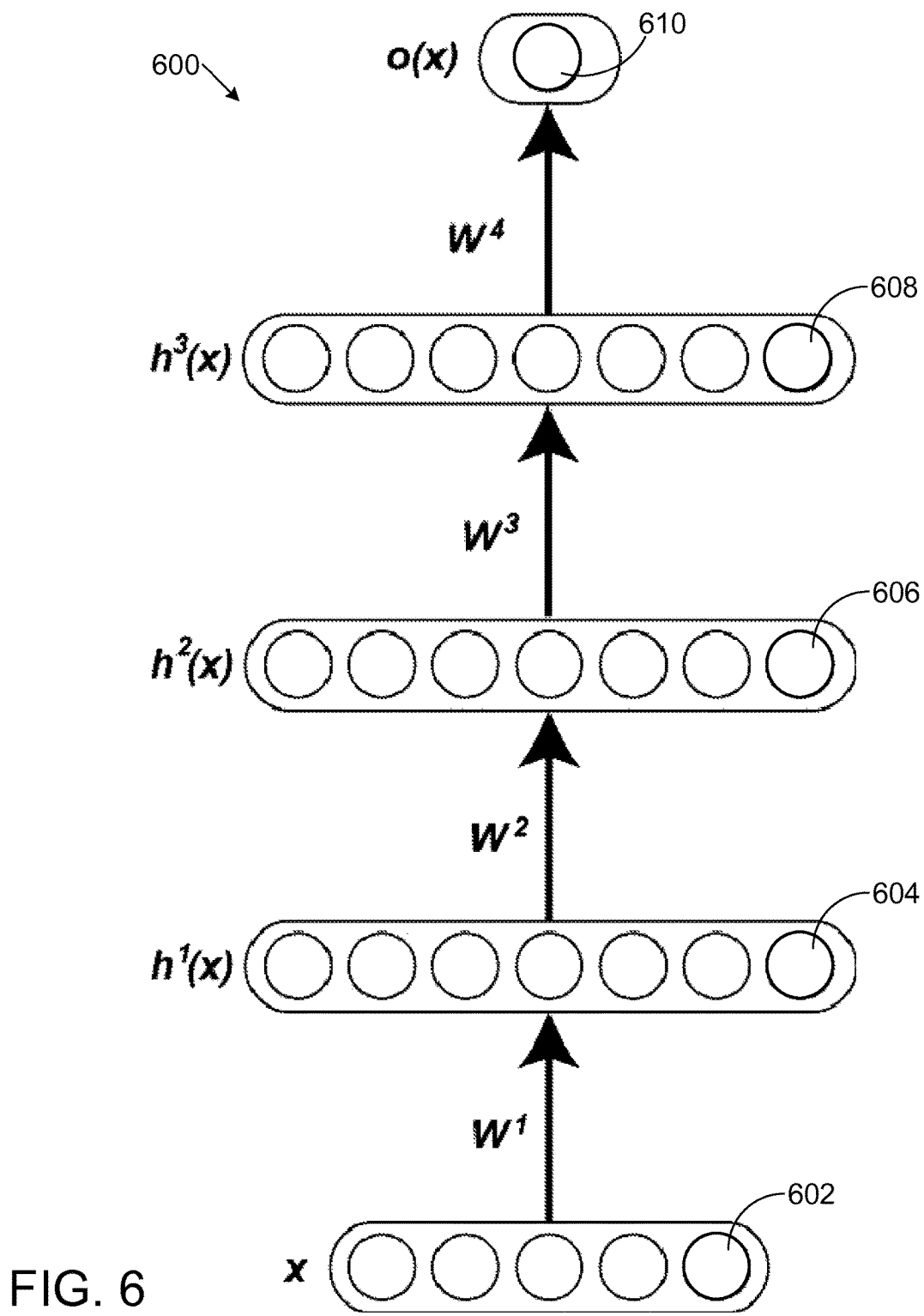
FIG. 6 is a diagram illustrating a simplified example of the deep learning network that is trained and then used to analyze the enterprise dataset.

FIG. 6 illustrates a simplified example of a deep learning network. As exemplified in FIG. 6, the deep learning network 600 has a hierarchy of layers which includes an input layer denoted as x, an output layer denoted as o(x), and three layers that are hidden in-between the input layer x and the output layer o(x), where these hidden layers are denoted as $h^1(x)$, $h^2(x)$ and $h^3(x)$. Each of these layers includes a plurality of elements that are referred to as neurons (e.g., neuron 602 in the input layer x, neuron 604 in the hidden layer $h^1(x)$, neuron 606 in the hidden layer $h^2(x)$, neuron 608 in the hidden layer $h^3(x)$, and neuron 610 in the output layer o(x)), each of which stores a value. Each of the neurons in a given layer is connected to zero, one or more than one of the neurons in an immediately anterior layer (if such a layer exists), and is also connected to zero, one or more than one of the neurons in an immediately posterior layer (if such a layer exists). Here, the terms "anterior" and "posterior" refer to adjacent layers in relation to a direction of information flow through the deep learning network 600, which is from bottom to top in FIG. 6. In other words, with respect to a given layer, anterior layers represent lower layers and posterior layers represent higher layers.

Referring again to FIG. 6, the neurons (e.g., 604) in the hidden layer $h^1(x)$ store a collection of values that are derived from the values stored in the neurons (e.g., 602) of the input layer x based on a set of weights $W^1$ that operate between x and $h^1(x)$. The neurons (e.g., 606) in the hidden layer $h^2(x)$ store a collection of values that are derived from the values stored in the neurons (e.g., 604) of the hidden layer $h^1(x)$ based on a set of weights $W^2$ that operate between $h^1(x)$ and $h^2(x)$. The neurons (e.g., 608) in the hidden layer $h^3(x)$ store a collection of values that are derived from the values stored in the neurons (e.g., 606) of the hidden layer $h^2(x)$ based on a set of weights $W^3$ that operate between $h^2(x)$ and $h^3(x)$. The neurons (e.g., 610) in the output layer $o(x)$ store a collection of values that are derived from the values stored in the neurons (e.g., 608) of the hidden layer $h^3(x)$ based on a set of weights $W^4$ that operate between $h^3(x)$ and $o(x)$.

As will be appreciated from the more detailed description that follows, the analytics technique implementations described herein can leverage many different types of global data sources, each of which may include vast amounts of data which is often referred to as "big data." For example, in one implementation of the analytics technique the global data sources include web search engine logs. In another implementation of the analytics technique the global data sources include the click logs of one or more web advertisements. In yet another implementation of the analytics technique the global data sources include web-based encyclopedia (e.g., WIKIPEDIA® (a registered trademark of the Wikimedia Foundation, Inc.), among others) entity links. In yet another implementation of the analytics technique the global data sources include one or more social media web sites (e.g., LINKEDIN® (a registered service mark of LinkedIn Corporation), FACEBOOK® (a registered trademark of Facebook, Inc.), and TWITTER® (a registered trademark of Twitter, Inc.), among others). In yet another implementation of the analytics technique the global data sources include one or more commercial databases. The term "commercial database" is used herein to refer to a database that is developed and maintained by a commercial entity, and is made available by the commercial entity to users for a fee. Exemplary commercial entities that offer one or more commercial databases include AVENTION, Inc., THOMSON REUTERS, and HOOVER'S Inc., among others.

As will also be appreciated from the more detailed description that follows, the analytics technique implementations described herein can be used to automatically analyze (e.g., perform automatic predictive analytics on) various types of enterprise data and various combinations thereof. By way of example but not limitation, in an exemplary implementation of the analytics technique the enterprise data to be analyzed includes one or more of CRM data, or human resources data, or supply chain management data, or enterprise content management data, or customer support data.

The analytics technique implementations described herein are advantageous for various reasons including, but not limited to, the following. As will also be appreciated from the more detailed description that follows, the analytics technique implementations produce a trained deep learning network that can be provided to and subsequently used by individuals within any enterprise to perform automatic predictive analytics on any desired portion (e.g., any one or more categories) of their enterprise data. The trained deep learning network is intelligent in that the world knowledge of the global data sources is encoded/transferred into the network during the course of its training. As such, when the trained deep learning network is used by individuals within a given enterprise to perform automatic predictive analytics on their enterprise data, the analytics are informed by the world knowledge that is encoded into the network, thus increasing the accuracy of the network's predictions. In other words, the enterprise data is supplemented with the world knowledge of the global data sources without individuals within the enterprise having to explicitly join the global data sources' big data with the enterprise data, thus increasing the efficiency of these individuals. Today's CRM systems are generally not linked to machine learning. The analytics technique implementations described herein can be used to incorporate machine learning into today's CRM systems and thus advantageously add intelligence to these systems.

As is appreciated in the arts of enterprise information systems and enterprise data management, the enterprise data that is maintained by individuals within a given enterprise is generally sparse and as such may not include many features (e.g., attributes of particular data elements, relationships/associations/correlations between particular data elements (which are sometimes generally referred to as "interconnections") and the like). As such, in order to augment this data sparsity and achieve acceptable analytics results these individuals have historically had to perform extensive supervised feature engineering on their data. This feature engineering is generally both resource and time intensive. The analytics technique implementations described herein are further advantageous in that they eliminate the need to perform this feature engineering, thus further increasing the efficiency of these individuals. More particularly, the analytics technique implementations combat the sparsity of enterprise data by employing a transfer learning methodology that automatically learns appropriate (e.g., meaningful and useful) features from both the raw enterprise data and the raw data from each of the global data sources. Additionally, the analytics technique implementations can be used by any enterprise to optimize a wide variety of enterprise outcome scenarios, resulting in an optimization of the enterprise's revenue and/or profitability. Exemplary enterprise outcome scenarios are described in more detail hereafter.

FIG. 1 illustrates one implementation, in simplified form, of a process for training a deep learning network to automatically analyze enterprise data. As exemplified in FIG. 1, the process starts with receiving raw data from one or more global data sources (process action 100), examples of which have been described heretofore. This raw data is then used to pre-train the deep learning network to predict the results of a specific enterprise outcome scenario (process action 102). As is appreciated in the art of deep learning, this pre-training generally involves using conventional methods to initialize/condition each of the nodes and connections in the deep learning network. More particularly and by way of example but not limitation, given a large body of text from the web (e.g., the aforementioned web advertisements click logs), even without knowing anything about the particular enterprise application(s) that generated this text, a conventional deep structured semantic learning network (also known as and hereafter simply referred to as a "DSSM" which is a text-based deep neural network method) can still be trained to capture the general semantic meaning of the text (in other words, the DSSM can be used to encode the associations of words/phrases in the text—e.g., "body shop" is more closely related to "car repair" than "a gym"). Then, when the deep learning network is trained for any specific enterprise task, this generally trained DSSM can then be used to initialize/condition each of the nodes and connections in the network, where this initialization/conditioning is done simply by copying the weights associated with the DSSM into the corresponding positions of the network. It is noted that the raw data that is received from the global data sources can also be used for any specific enterprise task, and more generally for any generalized machine learning task, but the main intent is to uncover and encode the associations in the data. Given the foregoing, it will be appreciated that using the generally trained DSSM to "pre-train" the deep learning network is advantageous in that it makes the network training more effective than using what would otherwise be random numbers to initialize/condition the network.

Referring again to FIG. 1, after the raw data received from each of the global data sources has been used to pre-train the deep learning network to predict the results of a specific enterprise outcome scenario (action 102), a specific training dataset that includes data that is exemplary of (e.g., similar to) the enterprise data to be analyzed is received (process action 104). In an exemplary implementation of the analytics technique described herein this training dataset is a set of enterprise data from an enterprise having a commercial pursuit that may be similar to the enterprise whose data is to be analyzed. The training dataset is then used to further train (e.g., fine-tune the training of) the deep learning network to predict the results of a specific enterprise outcome scenario (process action 106), where this further training is performed using conventional deep learning methods (e.g., using back propagation to update the parameters of the network so that it can more accurately perform its prediction), and this specific enterprise outcome scenario can be either the same as the specific enterprise outcome scenario to which the network was pre-trained (action 102) or another specific enterprise outcome scenario. For example, consider an exemplary case where the specific enterprise outcome scenario is successfully closing a sales deal with a particular customer. A training dataset can be constructed from the enterprise's sales transaction records, where this training dataset includes a set of features that describe the sales deal (e.g., the name of the customer, the type of commercial pursuit the customer is involved in, and a budgetary estimation of the size of the sales deal, among other possible features). Then, given these features, the trained deep learning network will be able to predict the likelihood of closing the sales deal. Consider another exemplary case where the specific enterprise outcome scenario is predicting what a given customer would buy next or what would make them happy. A training dataset can be constructed from the enterprise's various customer records (e.g., customer support logs, satisfaction surveys, consumption data, purchasing history, and the like). Then, given this training dataset, the trained deep learning network will be able to predict what the customer would buy next or what would make them happy.

Referring again to FIG. 1, in one implementation of the analytics technique described herein the trained deep learning network is output (process action 108), and may then be provided to and utilized by a given enterprise to automatically analyze its data. In another implementation of the analytics technique the enterprise data to be analyzed is received (process action 110), and the trained deep learning network is used to predict the results of a specific enterprise outcome scenario from this enterprise data (process action 112), where this specific enterprise outcome scenario can be either the same as the specific enterprise outcome scenario to which the network was trained (action 106) or another specific enterprise outcome scenario. Then, whenever the accuracy of the predicted results is less than a prescribed threshold (process action 114, Yes), which may occur in the case where the features of the enterprise data are substantially different than the features of the training dataset, the enterprise data is used to re-train (e.g., fine-tune/refine the training of) the deep learning network to predict the results of the specific enterprise outcome scenario (process action 116). Actions 112, 114 and 116 may then be repeated until the accuracy of the predicted results is greater than or equal to the prescribed threshold (process action 114, No). As is appreciated in the art of machine learning, the accuracy of the predicted results may be determined using various conventional methods such as a conventional area under curve metric, among others. It will be appreciated that the prescribed threshold can be determined in various ways. For example, the prescribed threshold may be determined using empirical analysis.

As is also appreciated in the art of machine learning, the specific enterprise outcome scenario to which the deep learning network is trained is sometimes referred to as a supervisory signal, and may be specified using certain features and/or events that are indicative of the occurrence of the scenario. In other words, the specific enterprise outcome scenario represents the desired output from the deep learning network. The deep learning network that is trained by the analytics technique implementations described herein can be used to predict the results of any specific enterprise outcome scenario that is generally supported by the enterprise data. By way of example but not limitation, in one implementation of the analytics technique where the enterprise data includes CRM data, the specific enterprise outcome scenario can be the sale of a particular product or service to a particular customer. In this particular implementation the trained deep learning network may be used to predict the probability of making (e.g., closing/winning) this sale.

In another implementation of the analytics technique described herein where the enterprise data includes CRM data, the specific enterprise outcome scenario can be opportunity scoring. In this particular implementation the trained deep learning network may be used to score (e.g., prioritize/rank) each of the enterprise's existing and potential new customers in terms of the probability (e.g., the likelihood) of making a sale. It is noted that using the trained deep learning network to perform opportunity scoring analytics is advantageous since it allows the enterprise's sales force to focus on the most promising opportunities at each point in time, thus optimizing the productivity of the sales force, and ultimately optimizing the revenue and/or profitability of the enterprise. Using the trained deep learning network to perform opportunity scoring analytics is also advantageous since it can prioritize sales leads, it can help the sales team go after the most promising leads, and it allows the enterprise to develop more accurate revenue forecasts.

In yet another implementation of the analytics technique described herein where the enterprise data includes CRM data, the specific enterprise outcome scenario can be upsell recommendations. In this particular implementation the trained deep learning network may be used to recommend specific product and/or service upgrades that each of the enterprise's existing customers might be interested in purchasing. For example, in the case where a given customer previously purchased an older version of a given product, the trained deep learning network may recommend that a new version of the product be offered for sale to the customer so that they can benefit from the new features and/or performance supported by this new version. The trained deep learning network may also recommend that a warranty for the product be offered for sale to the customer.

In yet another implementation of the analytics technique described herein where the enterprise data includes CRM data, the specific enterprise outcome scenario can be cross-sell recommendations. In this particular implementation the trained deep learning network may be used to recommend specific new categories of products and/or services that each of the enterprise's existing customers might be interested in purchasing. For example, in the case where a given customer previously purchased a product or service in one category (e.g., a personal computer), the trained deep learning network may recommend that a product or service in another category (e.g., one or more software applications) be offered for sale to the customer.

In yet another implementation of the analytics technique described herein where the enterprise data includes CRM data, the specific enterprise outcome scenario can be next action recommendations. In this particular implementation the trained deep learning network may be used to score the possible next actions the sales force might take with regard to each of the enterprise's customers, where these next actions may be associated with increasing customer satisfaction and sales, among other things. In yet another implementation of the analytics technique where the enterprise data includes CRM data, the specific enterprise outcome scenario can be churn minimization. In this particular implementation the trained deep learning network may be used to score each of each of the enterprise's existing customers in terms of the probability (e.g., the risk) of losing them as a customer over a prescribed period of time. It is noted that using the trained deep learning network to perform next action recommendations and/or churn minimization analytics is advantageous since it allows the enterprise to maximize their customer satisfaction and thus minimize their customer attrition rate.

It is noted that the aforementioned training and re-training of the deep learning network (actions 106 and 116) can be performed using any one of a variety of machine learning methods that are applicable to deep learning. For example, this training can be performed using either a deep neural network method, or a logistic regression method, or a decision trees method, or a support vector machine method, among others.

Figure 2:
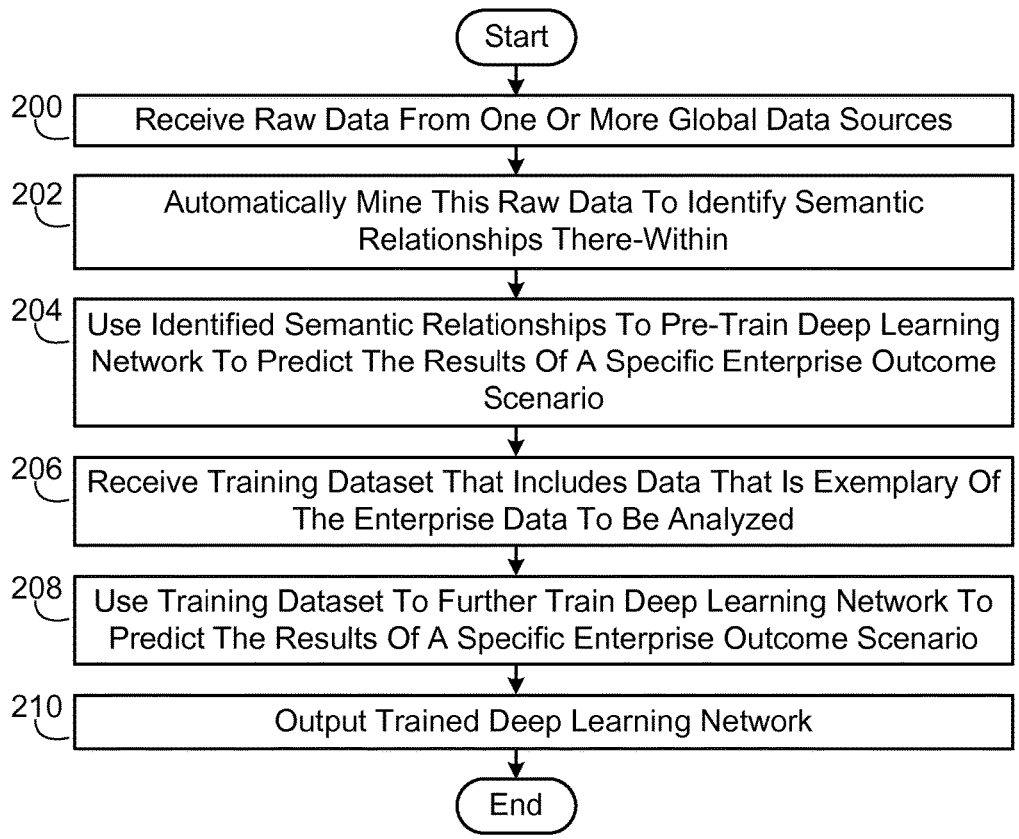
FIG. 2 is a flow diagram illustrating another implementation, in simplified form, of a process for training a deep learning network to automatically analyze enterprise data.

FIG. 2 illustrates another implementation, in simplified form, of a process for training a deep learning network to automatically analyze enterprise data. As exemplified in FIG. 2, the process starts with receiving raw data from one or more global data sources (process action 200), examples of which have been described heretofore. This raw data is then automatically mined (e.g., analyzed) to identify (e.g., learn) semantic relationships (e.g., associations) therewithin (process action 202). This automatic mining of the raw data from each of the global data sources can be performed using various conventional methods. In an exemplary implementation of the analytics technique described herein the automatic mining of the raw data from each of the global data sources is performed using a conventional deep structured semantic learning (also known as "DSSM" and "deep semantic similarity learning") method. The identified semantic relationships are then used to pre-train the deep learning network to predict the results of a specific enterprise outcome scenario (process action 204). In an exemplary implementation of the analytics technique this pre-training is performed as described heretofore.

Referring again to FIG. 2, after the identified semantic relationships have been used to pre-train the deep learning network to predict the results of a specific enterprise outcome scenario (action 204), a specific training dataset that includes data that is exemplary of the enterprise data to be analyzed is received (process action 206). The training dataset is then used to further train the deep learning network to predict the results of a specific enterprise outcome scenario (process action 208), where this specific enterprise outcome scenario can be either the same as the specific enterprise outcome scenario to which the network was pre-trained (action 204) or another specific enterprise outcome scenario. In other words, the pre-trained (using the raw data received from the global data sources) deep learning network is used to supplement the training of the deep learning network using the in-enterprise data. The trained deep learning network is then output (process action 210), and may then be provided to and utilized by a given enterprise to automatically analyze its data.

It is noted that the processes exemplified in FIGS. 1 and 2 can be used to train a variety of deep learning networks. In a tested implementation of the analytics technique described herein the deep learning network that is trained by these processes is a conventional deep neural network. The analytics technique implementations may also be used to train other types of deep learning networks such as a conventional deep boltzmann machine, and a conventional deep belief network, among others.

Figure 3:
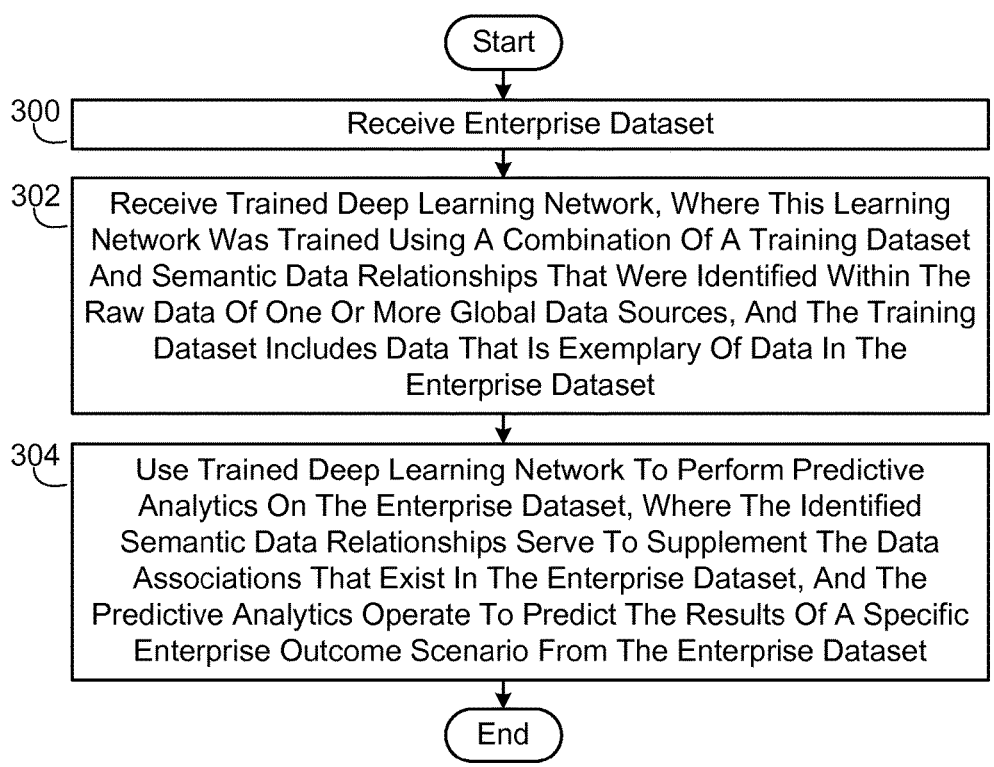
FIG. 3 is a flow diagram illustrating an exemplary implementation, in simplified form, of a process for analyzing an enterprise dataset.

FIG. 3 illustrates an exemplary implementation, in simplified form, of a process for analyzing an enterprise dataset. As exemplified in FIG. 3, the process starts with receiving the enterprise dataset (process action 300). A trained deep learning network is then received, where this network was trained using a combination of a specific training dataset and semantic data relationships that were identified within the raw data of one or more global data sources, and the training dataset includes data that is exemplary of data in the enterprise dataset (process action 302). The trained deep learning network is then used to perform predictive analytics on the enterprise dataset, where the identified semantic data relationships serve to supplement the data associations that exist in the enterprise dataset, and the predictive analytics operate to predict the results of a specific enterprise outcome scenario from the enterprise dataset (process action 304).

It is noted that each of the process actions described herein is realized on a computing device such as that which is described in more detail hereafter.

2.1 System Framework

Figure 4:
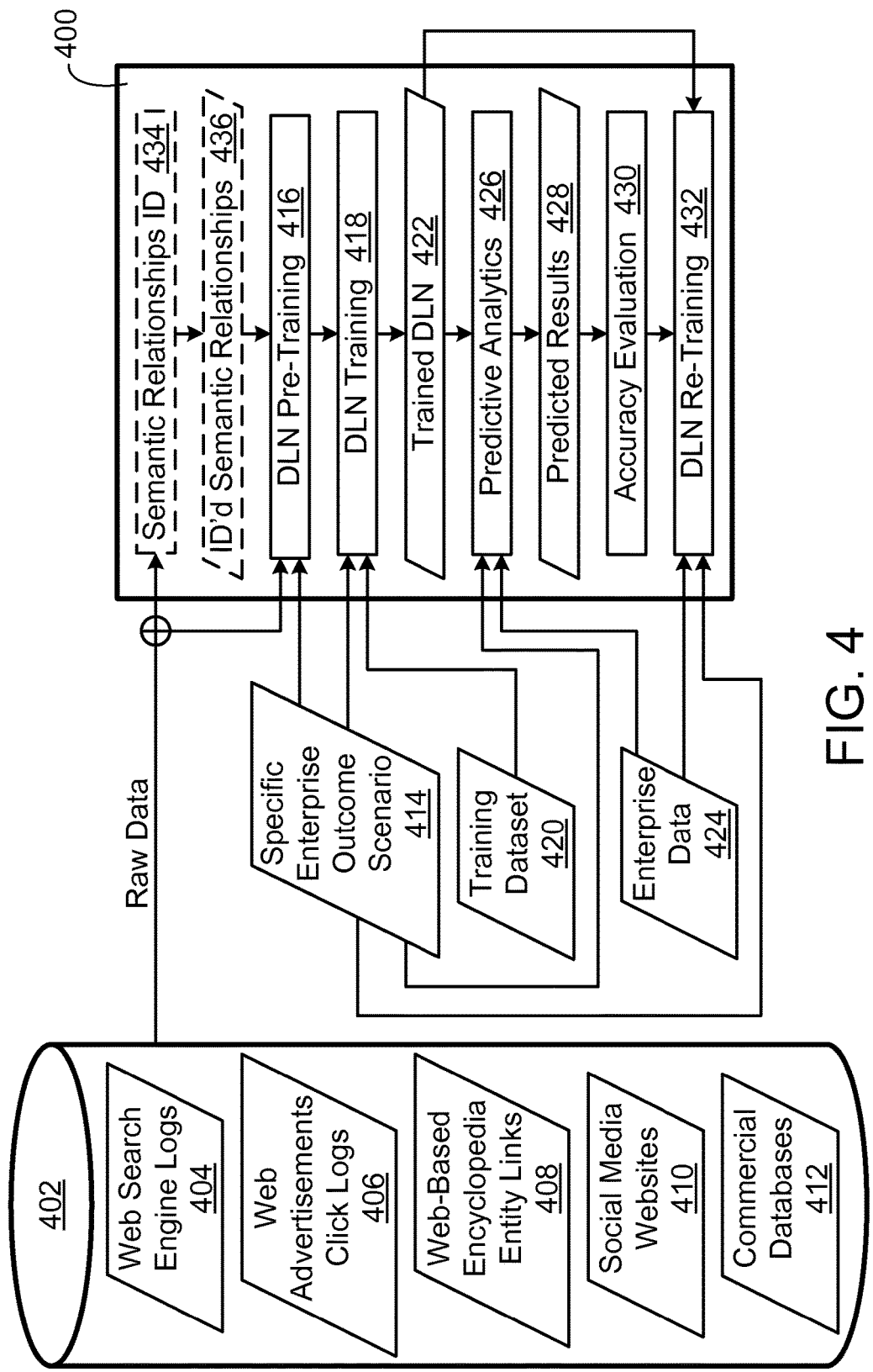
FIG. 4 is a diagram illustrating an exemplary implementation, in simplified form, of a system framework for training a deep learning network to automatically analyze enterprise data. This system framework may also be used to analyze a given enterprise dataset.

FIG. 4 illustrates an exemplary implementation, in simplified form, of a system framework for training a deep learning network to automatically analyze enterprise data. As exemplified in FIG. 4, the system framework 400 includes a semantic relationships identification (ID) program module 434, a deep learning network (DLN) pre-training program module 416, a deep learning network training program module 418, a predictive analytics program module 426, an accuracy evaluation program module 430, and a deep learning network re-training program module 432. Each of these program modules is realized on a computing device such as that which is described in more detail hereafter. The deep learning network pre-training program module 416 receives raw data from one or more global data sources 402 and uses this raw data to pre-train a deep learning network to predict the results of a specific enterprise outcome scenario 414, examples of which have been described heretofore. As described heretofore, the global data sources can include web search engine logs 404, or the click logs of one or more web advertisements 406, or web-based encyclopedia entity links 408, or one or more social media websites 410, or one or more commercial databases 412, or any combination thereof. The deep learning network training program module 418 uses the aforementioned training dataset 420 to further train the deep learning network to predict the results of a specific enterprise outcome scenario 414, where this specific enterprise outcome scenario can be either the same as the specific enterprise outcome scenario to which the deep learning network was pre-trained or another specific enterprise outcome scenario.

Referring again to FIG. 4, the predictive analytics program module 426 uses the trained deep learning network 422 that is output by the training program module 418 to predict the results of a specific enterprise outcome scenario 414 from the enterprise data 424 that is to be analyzed, where this specific enterprise outcome scenario can be either the same as the specific enterprise outcome scenario to which the deep learning network was trained or another specific enterprise outcome scenario. The accuracy evaluation program module 430 evaluates the accuracy of the predicted results 428 that are output by the predictive analytics program module 426 and whenever the accuracy of these results 428 is less than the aforementioned prescribed threshold, the deep learning network re-training program module 432, uses the enterprise data 424 to re-train the deep learning network 422 to predict the results of the specific enterprise outcome scenario 414.

Referring again to FIG. 4 and as described heretofore, in an alternate implementation of the system framework 400 the semantic relationships identification program module 434 receives raw data from the one or more global data sources 402 and automatically mines this raw data to identify semantic relationships there-within. The deep learning network pre-training program module 416 uses the semantic relationships 436 that are identified (ID'd) by the semantic relationships identification program module 434 to pre-train the deep learning network to predict the results of a specific enterprise outcome scenario 414.

Given the foregoing, it will be appreciated that the system framework described in this section may also be used to analyze a given enterprise dataset.

Given the foregoing, it will be appreciated that the analytics technique implementations described herein can be made available to a given enterprise in various ways. For example, in one version of the analytics technique implementations the system framework 400 exemplified in FIG. 4 can be installed on one or more computing devices residing inside the managed domain of the enterprise. In another version of the analytics technique implementations the system framework 400 can be installed on one or more computing devices residing in the cloud (e.g., outside the managed domain of the enterprise) and offered to the enterprise as a cloud service. This particular version assumes that the enterprise allows the cloud service to access their enterprise data.

3.0 Other Implementations

While the analytics technique has been described by specific reference to implementations thereof, it is understood that variations and modifications thereof can be made without departing from the true spirit and scope of the analytics technique. It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 5:
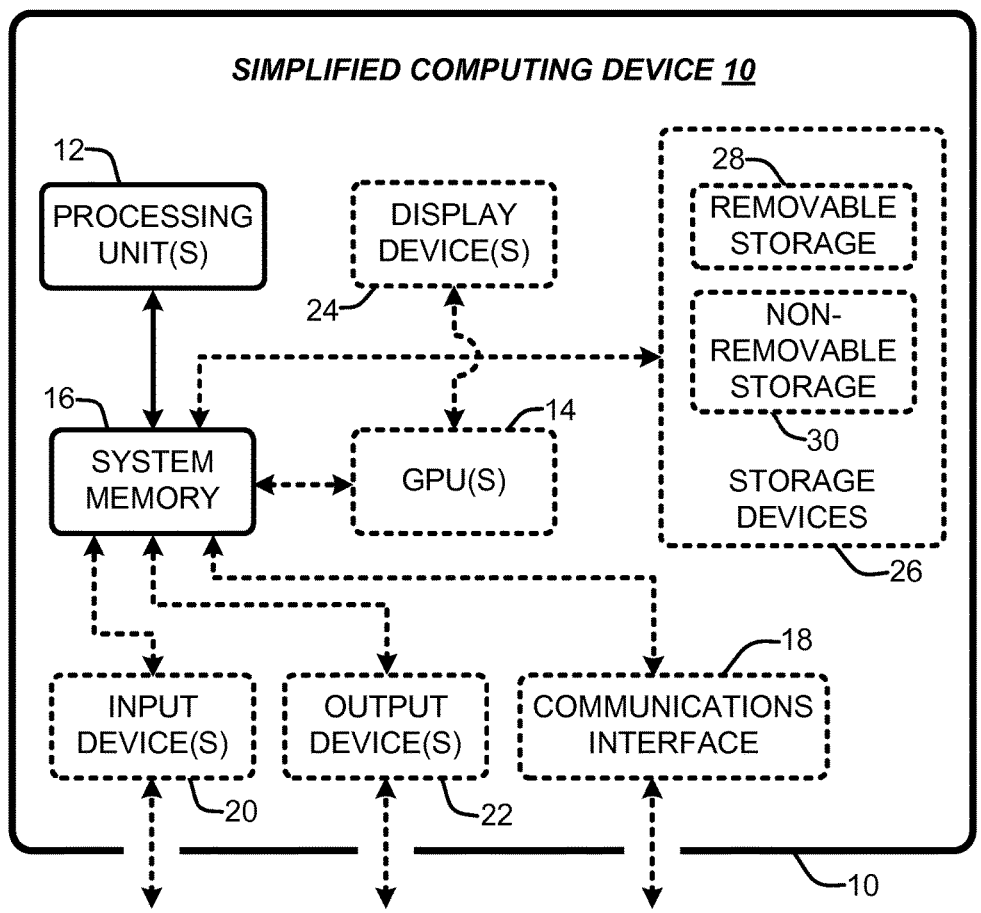
FIG. 5 is a diagram illustrating a simplified example of a general-purpose computer system on which various implementations and elements of the analytics technique, as described herein, may be realized.

The analytics technique implementations described herein are operational within numerous types of general purpose or special purpose computing system environments or configurations. FIG. 5 illustrates a simplified example of a general-purpose computer system on which various implementations and elements of the analytics technique, as described herein, may be implemented. It is noted that any boxes that are represented by broken or dashed lines in the simplified computing device 10 shown in FIG. 5 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the analytics technique implementations described herein, the device should have a sufficient computational capability and system memory to enable basic computational operations. In particular, the computational capability of the simplified computing device 10 shown in FIG. 5 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the analytics technique implementations described herein, including input, output, control, feedback, and response to one or more users or other devices or systems associated with the analytics technique implementations, are enabled by a variety of Natural User Interface (NUI) scenarios. The NUI techniques and scenarios enabled by the analytics technique implementations include, but are not limited to, interface technologies that allow one or more users user to interact with the analytics technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the analytics technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the analytics technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 5 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various analytics technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The analytics technique implementations described herein may be further described in the general context of computer-executable instructions, such as program modules, being executed by a computing device. Generally, program modules include routines, programs, objects, components, data structures, and the like, that perform particular tasks or implement particular abstract data types. The analytics technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

5.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for training a deep learning network to automatically analyze enterprise data. This system includes one or more computing devices which are in communication with each other via a computer network whenever there is a plurality of computing devices, and a computer program having program modules executable by the one or more computing devices. The one or more computing devices are directed by the program modules of the computer program to receive raw data from one or more global data sources, use this raw data to pre-train the deep learning network to predict the results of a specific enterprise outcome scenario, receive a training dataset which includes data that is exemplary of the enterprise data, use the training dataset to further train the deep learning network to predict the results of a specific enterprise outcome scenario, and output the trained deep learning network.

In one implementation of the just-described system, the deep learning network is a deep neural network. In another implementation, the global data sources include web search engine logs. In another implementation, the global data sources include the click logs of one or more web advertisements. In another implementation, the global data sources include web-based encyclopedia entity links. In another implementation, the global data sources include one or more social media websites. In another implementation, the global data sources include one or more commercial databases.

In one implementation, the specific enterprise outcome scenario includes one of: the sale of a particular product or service to a particular customer; or opportunity scoring; or upsell recommendations; or cross-sell recommendations; or next action recommendations; or churn minimization. In another implementation, the enterprise data includes one or more of: customer relationship management data; or or human resources data; or supply chain management data; or enterprise content management data; or customer support data. In another implementation, the one or more computing devices are further directed by the program modules of the computer program to, receive the enterprise data, use the trained deep learning network to predict the results of a specific enterprise outcome scenario from the enterprise data, and whenever the accuracy of the predicted results is less than a prescribed threshold, use the enterprise data to re-train the deep learning network to predict the results of the specific enterprise outcome scenario.

In another implementation, another system is employed for for training a deep learning network to automatically analyze enterprise data. This system includes one or more computing devices which are in communication with each other via a computer network whenever there is a plurality of computing devices, and a computer program having program modules executable by the one or more computing devices. The one or more computing devices are directed by the program modules of the computer program to receive raw data from one or more global data sources, automatically mine this raw data to identify semantic relationships within this raw data, use the identified semantic relationships to pre-train the deep learning network to predict the results of a specific enterprise outcome scenario, receive a training dataset which includes data that is exemplary of the enterprise data, use the training dataset to further train the deep learning network to predict the results of a specific enterprise outcome scenario, and output the trained deep learning network.

In one implementation of the just-described system, the automatic mining of the raw data is performed using a deep structured semantic learning method. In another implementation, the deep learning network is a deep neural network. In another implementation, the global data sources include web search engine logs. In another implementation, the global data sources include the click logs of one or more web advertisements. In another implementation, the global data sources include web-based encyclopedia entity links. In another implementation, the global data sources include one or more social media websites. In another implementation, the global data sources include one or more commercial databases. In another implementation, the specific enterprise outcome scenario includes one of: the sale of a particular product or service to a particular customer; or opportunity scoring; or upsell recommendations; or cross-sell recommendations; or next action recommendations; or churn minimization. In another implementation, the global data sources include one or more of: web search engine logs; or the click logs of one or more web advertisements; or web-based encyclopedia entity links; or one or more social media websites; or one or more commercial databases.

The implementations described in any of the previous paragraphs in this section may also be combined with each other, and with one or more of the implementations and versions described prior to this section. For example, some or all of the preceding implementations and versions may be combined with the foregoing implementation where the global data sources include one or more of: web search engine logs; or the click logs of one or more web advertisements; or web-based encyclopedia entity links; or one or more social media websites; or one or more commercial databases.

In another implementation, a system is employed for analyzing an enterprise dataset. This system includes one or more computing devices which are in communication with each other via a computer network whenever there is a plurality of computing devices, and a computer program having program modules executable by the one or more computing devices. The one or more computing devices are directed by the program modules of the computer program to receive the enterprise dataset, receive a trained deep learning network, the deep learning network having been trained using a combination of a training dataset and semantic data relationships identified within the raw data of one or more global data sources, the training dataset including data that is exemplary of data in the enterprise dataset, and use the trained deep learning network to perform predictive analytics on the enterprise dataset, these identified semantic data relationships serving to supplement data associations existing in the enterprise dataset, these analytics operating to predict the results of a specific enterprise outcome scenario from the enterprise dataset.

In one implementation, a deep learning network training system is implemented by a means for training a deep learning network to automatically analyze enterprise data. This deep learning network training system includes one or more computing devices which are in communication with each other via a computer network whenever there is a plurality of computing devices. These computing devices include processors configured to execute a receiving step for receiving raw data from one or more global data sources, a pre-training step for using this raw data to pre-train the deep learning network to predict the results of a specific enterprise outcome scenario, another receiving step for receiving a training dataset which includes data that is exemplary of the enterprise data, a further training step for using the training dataset to further train the deep learning network to predict the results of a specific enterprise outcome scenario, and an outputting step for outputting the trained deep learning network.

In one version of the just-described deep learning network training system, the processors are further configured to execute yet another receiving step for receiving the enterprise data, a prediction step for using the trained deep learning network to predict the results of a specific enterprise outcome scenario from the enterprise data, and whenever the accuracy of the predicted results is less than a prescribed threshold, a re-training step for using the enterprise data to re-train the deep learning network to predict the results of the specific enterprise outcome scenario.

In another implementation, another deep learning network training system is implemented by a means for training a deep learning network to automatically analyze enterprise data. This deep learning network training system includes one or more computing devices which are in communication with each other via a computer network whenever there is a plurality of computing devices. These computing devices include processors configured to execute a receiving step for receiving raw data from one or more global data sources, a data mining step for automatically mining this raw data to identify semantic relationships within this raw data, a pre-training step for using the identified semantic relationships to pre-train the deep learning network to predict the results of a specific enterprise outcome scenario, another receiving step for receiving a training dataset which includes data that is exemplary of the enterprise data, a further training step for using the training dataset to further train the deep learning network to predict the results of a specific enterprise outcome scenario, and an outputting step for outputting the trained deep learning network.

In another implementation, a dataset analysis system is implemented by a means for analyzing an enterprise dataset. This dataset analysis system includes one or more computing devices which are in communication with each other via a computer network whenever there is a plurality of computing devices. These computing devices include processors configured to execute a receiving step for receiving the enterprise dataset, another receiving step for receiving a trained deep learning network, the deep learning network having been trained using a combination of a training dataset and semantic data relationships identified within the raw data of one or more global data sources, the training dataset including data that is exemplary of data in the enterprise dataset, and a predictive analytics step for using the trained deep learning network to perform predictive analytics on the enterprise dataset, these identified semantic data relationships serving to supplement data associations existing in the enterprise dataset, these analytics operating to predict the results of a specific enterprise outcome scenario from the enterprise dataset.

Wherefore, what is claimed is:

1. A system for training a deep learning network to automatically analyze enterprise data, comprising:
one or more computing devices, said computing devices including one or more processors and being in communication with each other via a computer network whenever there is a plurality of computing devices; and
a computer program having program modules executable by the one or more processors, the one or more processors being directed by the program modules of the computer program to:
receive, via a communications interface, raw data from one or more global data sources;
perform unsupervised feature learning of a set of features from the raw data;
use said raw data including the set of features learned from the raw data to pre-train the deep learning network to predict the results of a specific enterprise outcome scenario;
receive, via the communications interface, a training dataset comprising a set of the enterprise data;
perform unsupervised feature learning of a set of features from the training dataset that differ from the set of features learned from the raw data;
use the training dataset including the set of features learned from the training dataset to further train the deep learning network to predict the results of the specific enterprise outcome scenario that the deep learning network was pre-trained to predict; and
output the trained deep learning network.

2. The system of claim 1, wherein the deep learning network comprises a deep neural network.

3. The system of claim 1, wherein the global data sources comprise web search engine logs.

4. The system of claim 1, wherein the global data sources comprise the click logs of one or more web advertisements.

5. The system of claim 1, wherein the global data sources comprise web-based encyclopedia entity links.

6. The system of claim 1, wherein the global data sources comprise one or more social media websites.

7. The system of claim 1, wherein the global data sources comprise one or more commercial databases.

8. The system of claim 1, wherein the specific enterprise outcome scenario comprises one of:
the sale of a particular product or service to a particular customer; or
opportunity scoring; or
upsell recommendations; or
cross-sell recommendations; or
next action recommendations; or
churn minimization.

9. The system of claim 1, wherein the enterprise data comprises one or more of:
customer relationship management data; or
or human resources data; or
supply chain management data; or
enterprise content management data; or
customer support data.

10. The system of claim 1, wherein the one or more processors are further directed by the program modules of the computer program to:
receive the enterprise data,
use the trained deep learning network to predict the results of the specific enterprise outcome scenario from the enterprise data, and
whenever the accuracy of the predicted results is less than a prescribed threshold, use the enterprise data to re-train the deep learning network to predict the results of the specific enterprise outcome scenario.

11. A system for training a deep learning network to automatically analyze enterprise data, comprising:
one or more computing devices, said computing devices including one or more processors and being in communication with each other via a computer network whenever there is a plurality of computing devices; and
a computer program having program modules executable by the one or more processors, the one or more processors being directed by the program modules of the computer program to:
receive, via a communications interface, raw data from one or more global data sources;
automatically mine said raw data to identify semantic relationships within said raw data using unsupervised feature learning;
use the identified semantic relationships to pre-train the deep learning network to predict the results of a specific enterprise outcome scenario;
receive, via the communications interface, a training dataset comprising a set of the enterprise data;
use the training dataset to further train the deep learning network to predict the results of the specific enterprise outcome scenario; and
output the trained deep learning network.

12. The system of claim 11, wherein the automatic mining of said raw data is performed using a deep structured semantic learning method.

13. The system of claim 11, wherein the deep learning network comprises a deep neural network.

14. The system of claim 11, wherein the global data sources comprise web search engine logs.

15. The system of claim 11, wherein the global data sources comprise the click logs of one or more web advertisements.

16. The system of claim 11, wherein the global data sources comprise web-based encyclopedia entity links.

17. The system of claim 11, wherein the global data sources comprise one or more social media websites.

18. The system of claim 11, wherein the global data sources comprise one or more commercial databases.

19. The system of claim 11, wherein the specific enterprise outcome scenario comprises one of:
the sale of a particular product or service to a particular customer; or
opportunity scoring; or
upsell recommendations; or
cross-sell recommendations; or
next action recommendations; or
churn minimization.

20. A system for analyzing an enterprise dataset, comprising:
one or more computing devices, said computing devices including one or more processors and being in communication with each other via a computer network whenever there is a plurality of computing devices; and
a computer program having program modules executable by the one or more processors, the one or more processors being directed by the program modules of the computer program to:
receive the enterprise dataset;

receive a trained deep learning network, the deep learning network having been pre-trained using semantic data relationships identified within raw data of one or more global data sources and using a set of features learned via unsupervised learning from the raw data, the deep learning network having then been trained using a training dataset comprising data a set of the enterprise dataset and using a set of features learned via unsupervised learning from the training dataset that differ from the set of features learned from the raw data; and use the trained deep learning network to perform predictive analytics on the enterprise dataset, said identified semantic data relationships serving to supplement data associations existing in the enterprise dataset, said analytics operating to predict the results of a specific enterprise outcome scenario from the enterprise dataset.

\* \* \* \* \*